United States Patent
Arimatsu (10) Patent No.: US 12,539,468 B2
(45) Date of Patent: Feb. 3, 2026

(54) AI STREAMER WITH FEEDBACK TO AI STREAMER BASED ON SPECTATORS

(71) Applicant: Sony Interactive Entertainment Inc., Tokyo (JP)

(72) Inventor: Kazuyuki Arimatsu, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 222 days.

(21) Appl. No.: 17/899,237

(22) Filed: Aug. 30, 2022

(65) Prior Publication Data

US 2024/0066413 A1 Feb. 29, 2024

(51) Int. Cl.
A63F 13/86 (2014.01)
A63F 13/45 (2014.01)

(52) U.S. Cl.
CPC .............. *A63F 13/86* (2014.09); *A63F 13/45* (2014.09)

(58) Field of Classification Search
CPC .............................. A63F 13/86; A63F 13/45
USPC ........................................................ 463/42
See application file for complete search history.

(56) References Cited

U.S. PATENT DOCUMENTS

| | | | |
|---|---|---|---|
| 10,105,608 B1 * | 10/2018 | George | A63F 13/211 |
| 2018/0139257 A1 * | 5/2018 | Ninoles | H04L 65/1089 |
| 2021/0093968 A1 | 4/2021 | McCoy et al. | |
| 2021/0299580 A1 * | 9/2021 | Chow | A63F 13/5375 |
| 2021/0394073 A1 | 12/2021 | Osman et al. | |
| 2022/0203232 A1 | 6/2022 | Wiggeshoff | |

OTHER PUBLICATIONS

PCT/US2023/072339 Notification of Transmittal of the International Search Report and the Written Opinion of the International Searching Authority, or the Declaration, PCT/ISA/220, and the International Search Report, PCT/ISA/210, Nov. 24, 2023.

* cited by examiner

*Primary Examiner* — Ryan Hsu
(74) *Attorney, Agent, or Firm* — Kilpatrick Townsend & Stockton LLP (57) ABSTRACT

A method is provided, including: executing a session of a video game; executing an artificial intelligence (AI) player that performs gameplay in the session of the video game; streaming video of the AI player's gameplay over a network to one or more spectator devices for viewing by one or more spectators respectively associated to the one or more spectator devices; receiving, over the network from the one or more spectator devices, feedback data indicating reactions of the one or more spectators to the video of the AI player's gameplay; adjusting the gameplay by the AI player based on the feedback data.

12 Claims, 6 Drawing Sheets

AI STREAMER WITH FEEDBACK TO AI STREAMER BASED ON SPECTATORS

BACKGROUND

1. Field of the Disclosure

The present disclosure relates generally to an AI streamer with feedback to the AI streamer based on spectators.

2. Description of the Related Art

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

It is in this context that implementations of the disclosure arise.

SUMMARY

Implementations of the present disclosure include methods, systems, and devices relating to an AI streamer with feedback to the AI streamer based on spectators.

In some implementations, a method is provided, including: executing a session of a video game; executing an artificial intelligence (AI) player that performs gameplay in the session of the video game; streaming video of the AI player's gameplay over a network to one or more spectator devices for viewing by one or more spectators respectively associated to the one or more spectator devices; receiving, over the network from the one or more spectator devices, feedback data indicating reactions of the one or more spectators to the video of the AI player's gameplay; adjusting the gameplay by the AI player based on the feedback data.

In some implementations, adjusting the gameplay by the AI player based on the feedback data includes, analyzing the feedback data to determine a level of interest of the one or more spectators.

In some implementations, adjusting the gameplay by the AI player is configured to increase the level of interest of the one or more spectators.

In some implementations, adjusting the gameplay by the AI player includes adjusting one or more parameters of a machine learning model.

In some implementations, adjusting the gameplay by the AI player includes generating training data based on the feedback data, and applying the training data to a machine learning model.

In some implementations, the feedback data indicates reactions including one or more of text, speech, facial expressions, gestures, an amount of time spent spectating the session, a number of the spectators.

In some implementations, adjusting the gameplay based on the feedback data includes associating positive feedback with gameplay actions performed by the AI player, and increasing the performance of the gameplay actions by the AI player.

In some implementations, adjusting the gameplay based on the feedback data includes associating negative feedback with gameplay actions performed by the AI player, and decreasing the performance of the gameplay actions by the AI player.

In some implementations, the method is performed in substantial real-time, such that the adjusting of the gameplay by the AI player is responsive to the feedback data during the session of the video game.

In some implementations, the AI player uses a machine learning model trained based on a human player's gameplay.

In some implementations, a non-transitory computer-readable medium is provided having program instructions embodied thereon that, when executed by at least one server computer, cause said at least one server computer to perform a method including the following operations: executing a session of a video game; executing an artificial intelligence (AI) player that performs gameplay in the session of the video game; streaming video of the AI player's gameplay over a network to one or more spectator devices for viewing by one or more spectators respectively associated to the one or more spectator devices; receiving, over the network from the one or more spectator devices, feedback data indicating reactions of the one or more spectators to the video of the AI player's gameplay; adjusting the gameplay by the AI player based on the feedback data.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, and devices for an AI streamer with feedback to the AI streamer based on spectators.

Broadly speaking, implementations of the present disclosure are drawn to methods, systems, media and other forms in which an artificial intelligence (AI) player of a video game (as opposed to a human player) engages in gameplay of the video game that is streamed over a network for spectating by various spectators. As the spectators witness the gameplay, their reactions to the gameplay are provided as feedback to adjust the gameplay by the AI player. For example, the AI player may adjust its gameplay so as to increase the level of interest on the part of the spectators. In some implementations, the feedback is used to train the underlying model of the AI player.

In other implementations, information about spectators is obtained in order to determine preferences of the spectators. These preferences are then utilized to select a given model to use for gameplay by an AI player that is streamed to the spectators. In this manner, an appropriate model that is likely to satisfy the spectators is chosen so that the spectators are more likely to have an engaging spectating experience.

With the above overview in mind, the following provides several example figures to facilitate understanding of the example embodiments.

Figure 1:
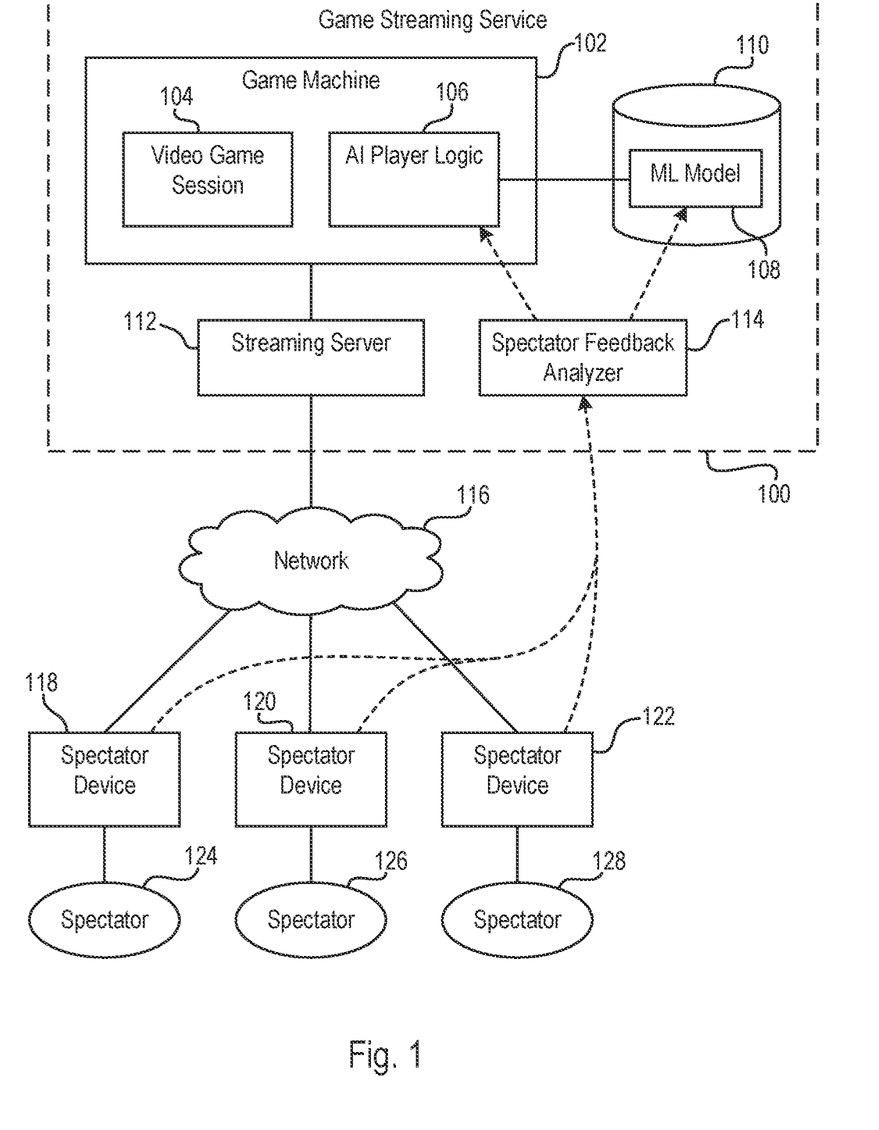
FIG. 1 conceptually illustrates a system for enabling spectating of gameplay performed by an AI player, in accordance with implementations of the disclosure.

FIG. 1 conceptually illustrates a system for enabling spectating of gameplay performed by an AI player, in accordance with implementations of the disclosure.

In the illustrative implementation, a game streaming service 100 is configured to enable streaming of gameplay video for spectating by various spectators. A game machine 102 executes a video game session 104, in which an artificial intelligence (AI) player participates in gameplay of the video game session 104. To this end, AI player logic 106 is executed to perform the gameplay of the video game by the AI player in the video game session 104. The AI player logic 106 may include/use or otherwise implement a machine learning (ML) model 108 that has been trained to perform such gameplay (e.g. execute gameplay decisions and commands in a given player role in the particular video game). As described in further detail below, in some implementations, the ML model 108 is selected from a number of such ML models stored to a model repository 110, and such selection can be based on characteristics of the spectators that will observe the gameplay.

As the AI player engages in gameplay of the video game session 104, so the video game session 104 outputs gameplay video for spectating. In some implementations, the gameplay video is processed by a streaming server 112, which streams/distributes the gameplay video over a network 116 (e.g. including the Internet), to various spectator devices 118, 120, and 122, which are respectively operated by spectators 124, 126, and 128, by way of example as shown in the illustrated implementation. The gameplay video is displayed by/via, or on, the spectator devices for viewing by the spectators. By way of example without limitation, examples of spectator devices include computers, laptops, game consoles, portable gaming devices, mobile devices, cellular phones, tablets, set-top boxes, streaming devices, etc. In various implementations, the spectator devices may include displays, or be connected to displays, on which the gameplay video is presented for viewing by the spectators. Examples of displays include televisions, monitors, LCD/LED displays, projectors, etc.

As the spectators spectate the gameplay video, their reactions while spectating can be captured and used as feedback for the AI player. For example, audio, video, text input, or other forms of input generated by the spectators can be captured as feedback during spectating. Additionally, more indirect forms of feedback can also be captured, such as the number of spectators (e.g. at a given time, or tracked over time), an amount of time spent spectating the session by the spectators (individually or collectively). Such feedback can be analyzed by a spectator feedback analyzer 114 to determine the meaning of the spectators' reactions. In some implementations, a sentiment analysis process is performed to understand the sentiment (e.g. positive or negative and how much) of the spectators while spectating the video game session 104. In some implementations, a level of interest/engagement/satisfaction of the spectators is determined.

Such spectator feedback can be used to influence the AI player. For example, in some implementations, the spectator sentiment is used to adjust how the AI player is playing in real-time. The gameplay by the AI player can be dynamically adjusted in response to the current level of interest of the spectators, so as to maintain or increase the level of interest. If spectator interest is detected to be decreasing, then this feedback can trigger adjustment of how the AI player is playing so as to increase spectator interest. In some implementations, positive feedback can be associated to gameplay actions/patterns/outcomes that resulted in the positive feedback, and this may reinforce or increase the performance of such actions/patterns or achievement of such outcomes by the AI player. Whereas negative feedback can be associated to gameplay actions/patterns/outcomes that resulted in the negative feedback, and this may decrease the performance of such actions/patterns or achievement of such outcomes by the AI player. In some implementations, the spectator feedback is used to adjust one or more parameters of the ML model 108, and thereby impact the gameplay by the AI player.

In some implementations, the spectator feedback can be stored and used as training data to train the ML model 108. For example, the ML model 108 can be trained accordingly so as to optimize the ML model 108 to perform gameplay that maintains or increases the interest level of the spectators. In some implementations, the spectator feedback is used to implement a supervised learning approach to training the ML model. For example, in some implementations, direct forms of feedback such as text/audio/image-based spectator reactions, are used to label gameplay activity, and the resulting training data forms the basis for conducting supervised learning by the ML model.

In some implementations, spectator feedback can be used to implement a reinforcement learning approach to training the ML model. For example, in some implementations, more indirect forms of spectator feedback (such as the number of spectators at any given time during gameplay, the amount of time spent spectating by the spectators, when spectators leave a given session, revenue generated by streaming on a streaming platform (live and/or recorded), etc.) can be used to design a reward system for performing reinforcement learning by the ML model. In some implementations, the ML model is trained to maximize the video streaming's revenue in a given term. It will be appreciated that in some implementations, metadata gathered from the video streaming platform can be used in this manner, without requiring additional implementation of direct feedback collection methods.

In some implementations, a hybrid learning approach can be implemented in accordance with the above-described methods. In some implementations, a hybrid of supervised learning using direct feedback from spectators, and reinforcement learning using indirect feedback, can be used to train the ML model.

In the above-described implementation, a cloud-based execution environment for the execution of the video game session and the instantiation of the AI player is described. However, it will be appreciated that in other implementations, the video game session and/or the AI player can be implemented on a local (non-cloud based) device such as a human player's game console or computer, etc.

Figure 2:
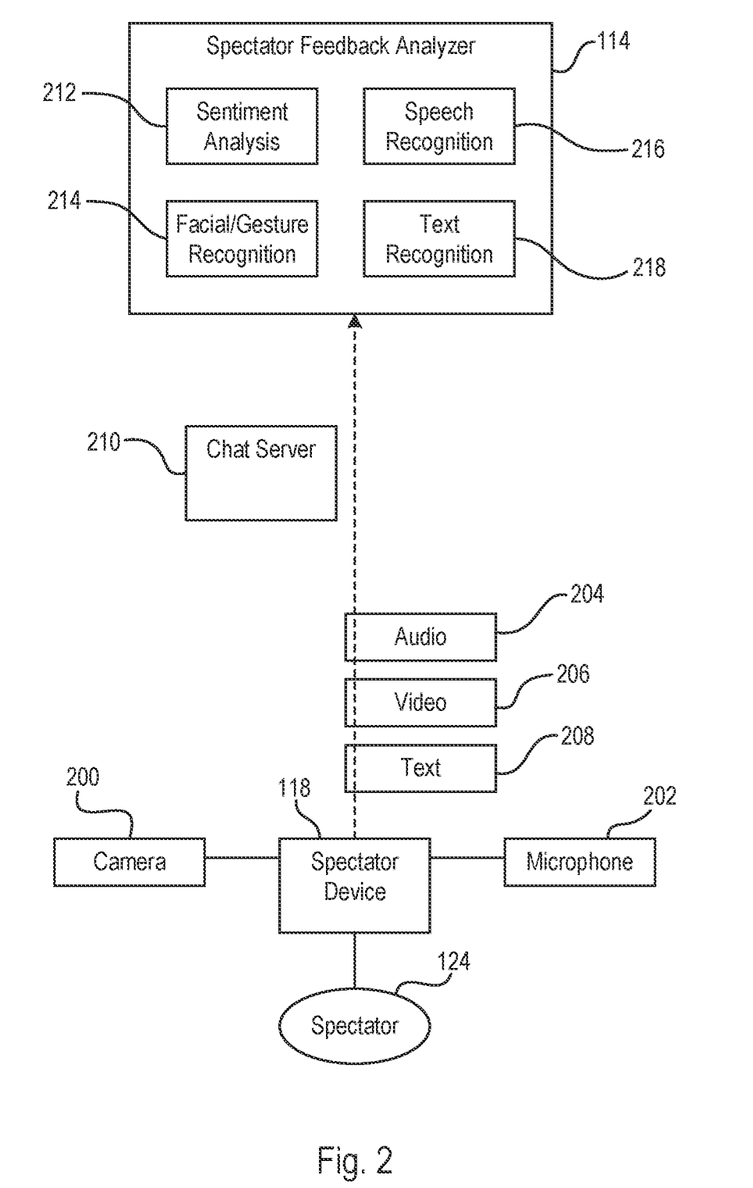
FIG. 2 conceptually illustrates processing of various forms of spectator feedback, in accordance with implementations of the disclosure.

FIG. 2 conceptually illustrates processing of various forms of spectator feedback, in accordance with implementations of the disclosure.

It will be appreciated that a given spectator that is spectating gameplay of an AI player may react in various ways, and that such can be captured and analyzed to determine the sentiment of the spectator. For example, a given spectator 124 that is spectating via the spectator device 118 may have their spectator audio 204 recorded by a microphone 202, including any speech or other sounds made by the spectator. As another example, the given spectator 124 may have spectator video 206 of themself captured by a camera 200, which can include their facial expressions and gestures/movements. Additionally, the spectator 124 may provide input in the form of text 208 (e.g. typed via a keyboard). In some implementations, such text input is provided in the form of a text chat in which spectators may participate while spectating the gameplay video. It will be appreciated that such text can include not only words or letters, but also symbols, emoticons, emojis, or other forms of communicative text as permitted by the system. By way of example without limitation, a chat server 210 is provided to execute the functionality of the spectator text chat, including receiving and delivering text input amongst the participants in the spectator text chat.

In some implementations, mechanisms are provided for spectators to express predefined sentiments/emotions. For example, spectators may indicate (e.g. via selection from a menu) thumbs up, thumbs down, like, dislike, laughter, anger, happiness, sadness, etc. as examples of predefined sentiments/emotions. In some implementations, when a given predefined sentiment/emotion is triggered, then a visual indication of the triggered sentiment/emotion is rendered and displayed to the spectators.

The audio 204, video 206, text 208, and any other spectator input is analyzed by the spectator feedback analyzer 114 to determine the sentiment of the spectator 124. Broadly speaking the spectator feedback analyzer 114 can perform a sentiment analysis process 212 to determine the spectator's sentiment. It will be appreciated that the content of the spectator's input may first be determined prior to determining the spectator sentiment. For example, a speech recognition process 216 is performed to determine/identify the contents of the spectator's speech/sounds. A facial/gesture recognition process 214 is performed to determine/identify the contents of the spectator's video, including the spectator's facial expressions and gestures/movements. A text recognition process 218 is performed to determine/identify the contents of the spectator's text (which in some implementations, is obtained from the chat server 210).

Based on the contents of the various inputs of the spectator, the sentiment analysis process 212 determines the sentiment of the spectator 124. In some implementations, the determined sentiment of the spectator can be in the form of a level of interest or engagement, an emotional state/level, a positive/negative sentiment level/amount, or other indication of how the spectator is reacting to the gameplay by the AI player. While a single spectator's inputs and sentiment have been described, it will be appreciated that similar processes can be applied to a plurality of spectators. In some implementations, the sentiment of a plurality of spectators is determined collectively. In some implementations, the collective sentiment of a plurality of spectators is determined based on the individually determined sentiment of individual ones of the spectators, such as by averaging or otherwise combining the spectators' individual sentiments.

As noted, the sentiment of the spectators can be used to adjust the gameplay by the AI player and/or train the underlying ML model of the AI player. Thus the AI player can be responsive to the spectators' sentiment. For example, if a decrease in spectator sentiment is detected, then the AI player may adjust its gameplay so as to increase the spectator sentiment.

Figure 3:
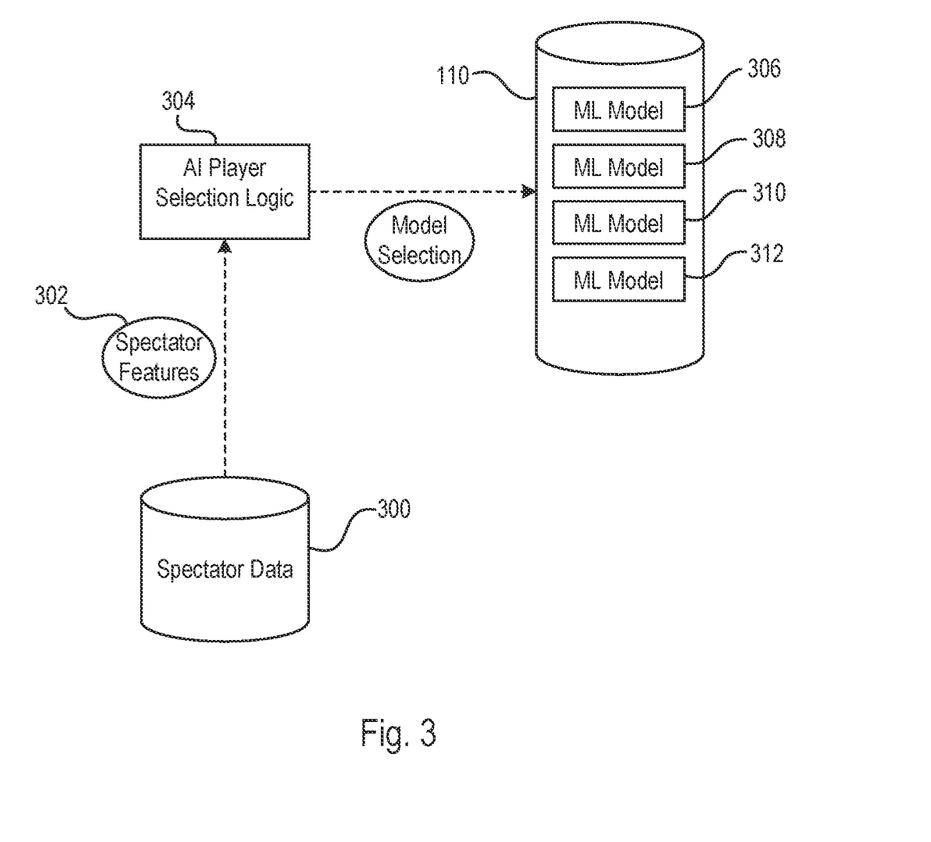
FIG. 3 conceptually illustrates selection of a ML model for gameplay based on characteristics of spectators, in accordance with implementations of the disclosure.

FIG. 3 conceptually illustrates selection of a ML model for gameplay based on characteristics of spectators, in accordance with implementations of the disclosure.

It will be appreciated that different spectators may have different preferences in terms of the type or style of gameplay they enjoy spectating. Thus, in the illustrated implementation, various ML models 306, 308, 310, and 312 are provided that have been trained to perform gameplay in different styles. It will be appreciated that there can be any number of ML models, and a suitable ML model can be selected for use for a given spectator or plurality of spectators.

In some implementations, AI player selection logic 304 is implemented to perform selection of a ML model from the model repository 110. For a given set of spectators, spectator features 302 are obtained from a spectator data storage 300. The spectator features can include various types of data that describes, or from which may be inferred, the spectating preferences of the spectators. By way of example without limitation, the spectator features may include demographic data, information about the spectators' spectating history (e.g. games previously spectated, previous feedback provided while spectating, players followed by the spectator, etc.), other gaming related information (e.g. game titles owned or played, amount of gameplay of game titles, skill level in a given video game, etc.), or other information from which a spectator's preferences for spectating gameplay can be determined or inferred.

The spectator features 302 are used to select a ML model from the model repository 110 to be implemented by the AI player, and so as to suit the spectating preferences of the spectators. In this way, the AI player is more likely to perform gameplay in a manner that is pleasing to the spectators, for example by executing a gameplay style that is preferred by the spectators.

Figure 4:
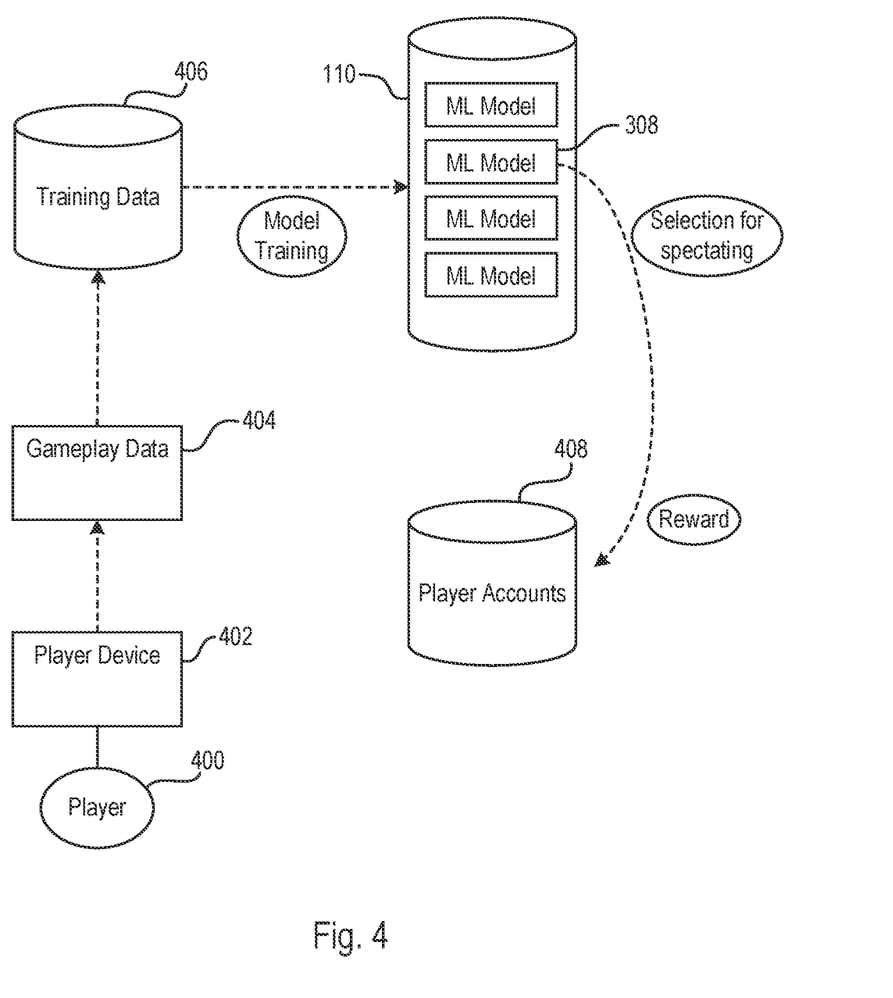
FIG. 4 conceptually illustrates training of a ML model for gameplay, in accordance with implementations of the disclosure.

FIG. 4 conceptually illustrates training of a ML model for gameplay, in accordance with implementations of the disclosure.

In some implementations, ML models can be trained for gameplay based on the gameplay of a human player. For example, in the illustrated implementation, a player 400 may play a video game using a player device 402 (e.g. game console, computer, mobile device, etc.). The gameplay data 404 from the gameplay by the player 400 is captured and converted to training data 406. It will be appreciated that the gameplay data 404 can include any game state data or other data that describes the player's gameplay, such as the player's inputs in response to given game scenarios/situations. The training data 406 is used to train a ML model 308 to perform gameplay in a style similar to that of the player 400.

The player's ML model 308 can be made available in the model repository 110, for selection and use for gameplay by an AI player as described herein. In some implementations, a given spectator or group of spectators may directly select the ML model of the player 400. In some implementations, the ML model is selected based on features/preferences of the spectators as discussed above.

In some implementations, if the player's ML model is selected for spectating, then a reward can be issued to the player whose ML model is selected, such as an amount of virtual currency (e.g. for use in a video game or on a gaming platform), status, points, trophies, etc. Such rewards can be reflected in the relevant player accounts 408.

Figure 5:
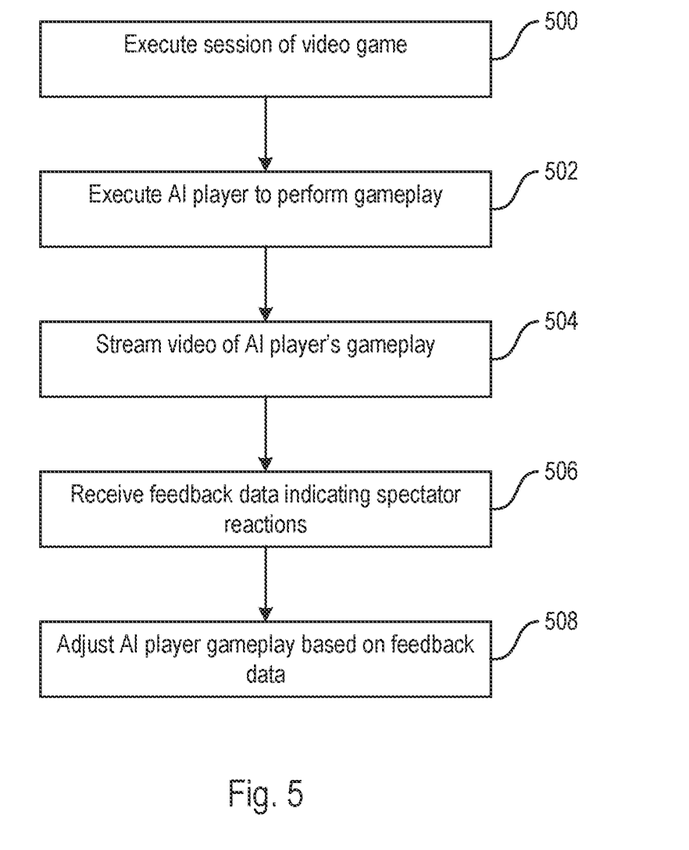
FIG. 5 conceptually illustrates a method for adjusting gameplay by an AI player, in accordance with implementations of the disclosure.

FIG. 5 conceptually illustrates a method for adjusting gameplay by an AI player, in accordance with implementations of the disclosure.

At method operation 500, a session of a video game is executed. At method operation 502, an AI player is executed to perform gameplay in the session of the video game. At method operation 504, video of the AI player's gameplay is streamed over a network to spectators. At method operation 506, feedback data is received that indicates reactions of the spectators to the video of the AI player's gameplay. At method operation 508, the gameplay by the AI player is adjusted based on the feedback data.

Figure 6:
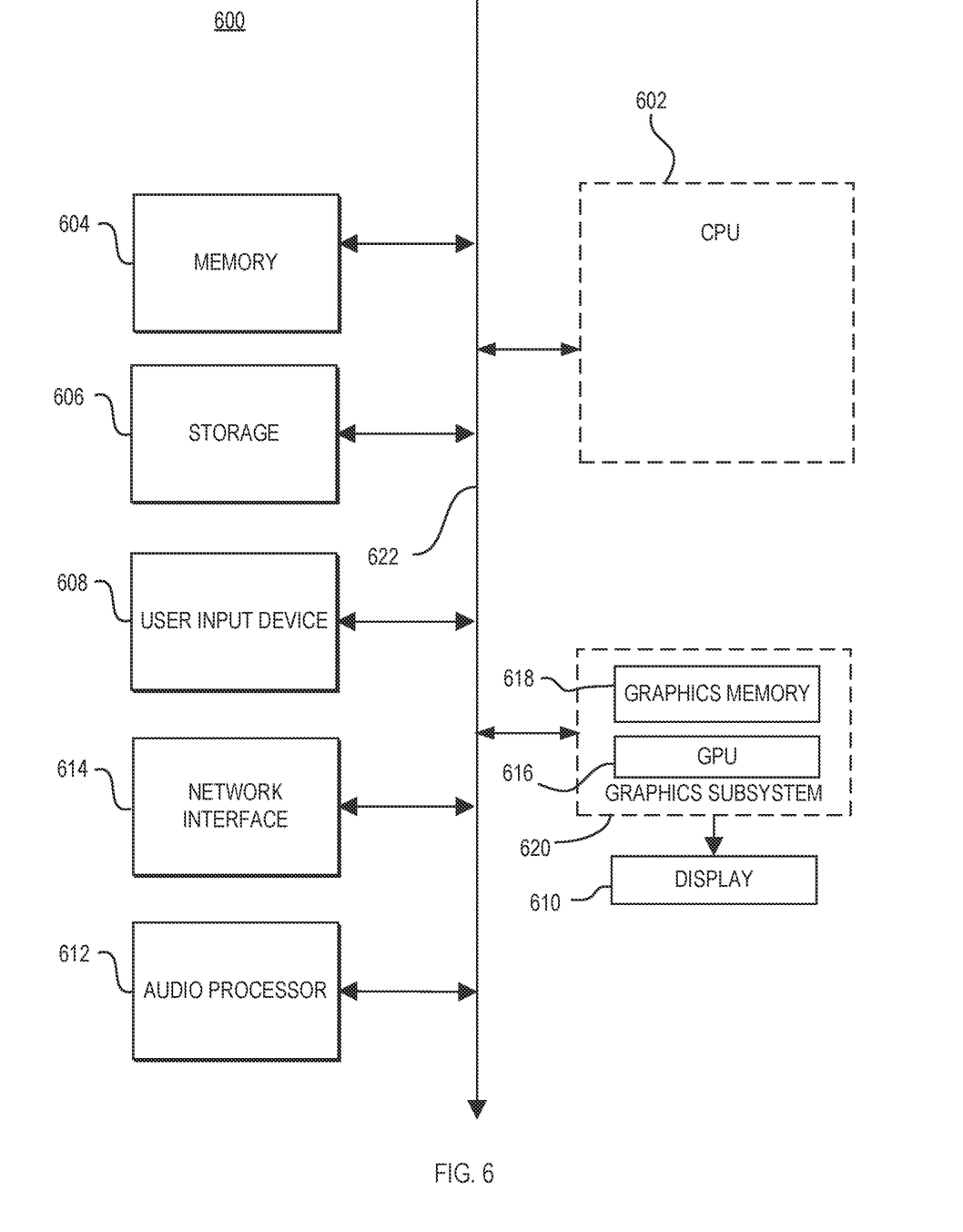
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:

executing a session of a video game;

executing an artificial intelligence (AI) player that performs gameplay in the session of the video game;

streaming video of the gameplay by the AI player over a network to one or more spectator devices for viewing by one or more spectators respectively associated to the one or more spectator devices, each of the one or more spectator devices having at least one recording device;

receiving, over the network from a respective spectator device, audio data captured by the respective spectator device, wherein the audio data corresponds to speech of a spectator associated to the respective spectator device; and adjusting the gameplay by the AI player by at least:

identifying positive feedback and negative feedback based on the audio data;

associating the positive feedback and the negative feedback with respective gameplay actions performed by the AI player;

adjusting one or more parameters of a ML model associated with the AI player; and controlling the execution of the AI player in the session of the video game to increase a performance by the AI player of gameplay actions associated with the positive feedback, and decrease the performance by the AI player of gameplay actions associated with the negative feedback.

2. The method of claim 1, wherein adjusting the gameplay by the AI player based on the audio data includes, analyzing the audio data to determine a level of interest of the one or more spectators.

3. The method of claim 2, wherein adjusting the gameplay by the AI player is configured to increase the level of interest of the one or more spectators.

4. The method of claim 1, wherein the audio data is recorded using a microphone associated with the respective spectator device.

5. The method of claim 1, wherein the method is performed in substantial real-time, such that the adjusting of the gameplay by the AI player is responsive to the audio data during the session of the video game.

6. The method of claim 1, wherein the ML model is further trained based on a human player's gameplay.

7. A non-transitory computer-readable medium having program instructions embodied thereon that, when executed by at least one server computer, cause said at least one server computer to perform a method including the following operations:

executing a session of a video game;

executing an artificial intelligence (AI) player that performs gameplay in the session of the video game;

streaming video of the gameplay by the AI player over a network to one or more spectator devices for viewing by one or more spectators respectively associated to the one or more spectator devices, each of the one or more spectator devices having at least one recording device;

receiving, over the network from a respective spectator device, audio data captured by the respective spectator device, wherein the audio data corresponds to speech of a spectator associated to the respective spectator device; and adjusting the gameplay by the AI player by at least identifying positive feedback and negative feedback based on the audio data;

associating the positive feedback and the negative feedback with respective gameplay actions performed by the AI player;

adjusting one or more parameters of a ML model associated with the AI player; and controlling the execution of the AI player in the session of the video game to increase a performance by the AI player of gameplay actions associated with the positive feedback, and decrease the performance by the AI player of gameplay actions associated with the negative feedback.

8. The non-transitory computer-readable medium of claim 7, wherein adjusting the gameplay by the AI player based on the audio data includes, analyzing the audio data to determine a level of interest of the one or more spectators.

9. The non-transitory computer-readable medium of claim 8, wherein adjusting the gameplay by the AI player is configured to increase the level of interest of the one or more spectators.

10. The non-transitory computer-readable medium of claim 7, wherein the audio data is recorded using a microphone associated with the respective spectator device.

11. The non-transitory computer-readable medium of claim 7, wherein the method is performed in substantial real-time, such that the adjusting of the gameplay by the AI player is responsive to the audio data during the session of the video game.

12. The non-transitory computer-readable medium of claim 7, wherein the ML model is further trained based on a human player's gameplay.

* * * * *